United States Patent Office 3,364,110
Patented Jan. 16, 1968

3,364,110
METHOD FOR PREVENTING COCCIDIOSIS WITH CERTAIN BENZOHYDROXAMIC ACID DERIVATIVES
Hanns Hanina Lehr, Montclair, and Milan Mitrovic, Nutley, N.J., and Moses Wolf Goldberg, deceased, late of Upper Montclair, N.J., by Regina Hauser Goldberg, executrix, Upper Montclair, N.J., assignors to Hoffmann-La Roche Inc., Nutley, N.J., a corporation of New Jersey
No Drawing. Filed Aug. 10, 1964, Ser. No. 389,515
6 Claims. (Cl. 167—53.1)

ABSTRACT OF THE DISCLOSURE

Compositions containing compounds of the formula

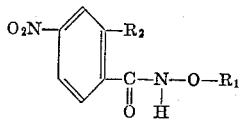

and salts thereof
wherein $R_1$ is hydrogen or methyl and $R_2$ is halo or nitro; useful for treating coccidiosis in poultry by addition thereof to feed or drinking water.

---

This invention relates to coccidiosis and methods in the field of veterinary medicine and animal husbandry. More particularly, the invention relates to a class of compounds found useful in the control of coccidiosis.

Coccidiosis, especially poultry coccidiosis, is a major problem. If not controlled, mortality and morbidity caused thereby effect severe economic loss in the raising of poultry. The present invention relates to compounds, compositions and methods useful in the control of coccidiosis.

More particularly, the compounds to which this invention relates are selected from the group consisting of compounds of the formula

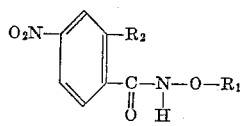

and salts thereof wherein $R_1$ is selected from the group consisting of hydrogen and methyl and $R_2$ is selected from the group consisting of halo and nitro.

The compounds of Formula I, wherein $R_1$ is hydrogen, are acidic in character and form salts. For example, they form alkali metal salts, with alkali metals, such as sodium and the like.

The above compounds are useful as coccidiostats. They are useful both for the prophylaxis and therapy of coccidiosis. They are especially useful by virtue of their high activity against *Eimeria tenella* and *E. necatrix*. A preferred compound of Formula I, due to especially high activity, is 2-chloro-4-nitrobenzohydroxamic acid.

The compounds of Formula I can be prepared in cases wherein $R_1$ is hydrogen by reacting an appropriate benzoylating agent with hydroxylamine. In cases wherein $R_1$ is methyl, the desired compounds of Formula I can be prepared by benzoylating methoxyamine. The benzoylation reaction is suitably effected in the presence of an acid accepting agent, for example, an alkali metal hydroxide or carbonate, an alkali earth metal hydroxide or carbonate, or the like. If desired, an excess of the hydroxylamine or methoxyamine reactant can serve as the acid acceptor. In conducting the reaction the hydroxylamine or methoxyamine is conveniently used in the form of an acid addition salt. Examples of such are hydroxylamine hydrochloride, hydroxylamine sulphate, methoxyamine hydrochloride or the like. The benzoylating agent is suitably a reactive derivative of the appropriate benzoic acid, i.e., of 2,4-dinitrobenzoic acid or of 2-halo-4-nitrobenzoic acid. Suitable reactive derivatives are halides (preferably chlorides or bromides), anhydrides and esters (preferably lower alkyl esters). The benzoylation is suitably effected at room temperature, but can also be effected at temperatures above or below room temperature. As a matter of operative convenience, room temperature is preferred.

The compounds of Formula I, when fed as a component of the poultry feed or drinking water to domestic fowl such as chickens subject to coccidiosis, effect good control of the disease, i.e., are effective prophylactic agents. The actual concentration of the active ingredient of Formula I in the animal feed or drinking water can, of course, be adjusted to individual needs and may vary over a wide range. The limiting criteria of the concentration are that the minimum concentration be such that a sufficient amount of active ingredient is provided to effect control of coccidiosis and that the maximum concentration be such that the amount of the composition ingested does not result in any undesirable effects. Thus, for example, a feed or complete feed suitably contains by weight from about .005 to about .25 percent of the active ingredient, preferably from about .01 to about .1 percent. In drinking water, a suitable concentration is from about .0025 to about .125 percent by weight, and a preferred range is from about .005 to about .05 percent by weight. Good control of the disease is effected when the active ingredient is administered to poultry, for example, chickens, in an amount equal to about 0.005 to about 0.25 percent by weight of the daily feed consumption. As used above, the term "complete feed" comprehends an article intended to be administered as the sole ration to an animal. The optimum dose level will, of course, vary with the specific compound, i.e., with the meanings of the symbols $R_1$ and $R_2$ in Formula I and can be readily determined by one skilled in the art. The above stated ranges have been found particularly advantageous with 2,4-nitrobenzohydroxamic acid.

When using the compounds of the invention for the control (i.e., prevention or treatment) of coccidiosis, the active coccidiostat can be first compounded or blended with a feed ingredient or a carrier to become a feed additive premix, a feed additive concentrate or a feed additive supplement. A feed additive concentrate or premix is an article intended to be further diluted to produce a complete feed. A feed additive supplement is an article intended for consumption of an animal directly or which can be further diluted to produce a complete feed or can be ingested as is as a supplement to other rations. Feed additive supplements, concentrates and premixes contain a relatively large percentage of coccidiostat, i.e., of the active ingredient of Formula I, and are conveniently prepared by adding the active ingredient to a suitable carrier and mixing in a manner to give a substantially uniform dispersion of the coccidiostat in the carrier. The carrier is suitably a solid that is inert with respect to the active ingredient and which may safely be ingested by the animals to be treated. Typical of such carriers are commercial poultry feeds, ground cereal grains, grain by-products, plant protein concentrates (soy, peanuts, etc.), fermentation by-products, salt, limestone, inorganic compounds, and the like, or admixtures thereof.

Typical poultry feeds which can be medicated with an active ingredient of this invention contain several ingredients. For example, they can contain high energy grain products such as corn, wheat, wheat red dog flour, milo, oat meal, or the like; medium and low energy drain products such as oats, barley, wheat flour middlings, standard middlings or the like; stabilized fats; vegetable proteins such as soybean meal, corn gluten meal, peanut meal, or the like; animal proteins such as fish meal, fish solubles, meat scraps, or the like; UGF (unidentified growth factor) sources and other B-vitamin carriers such as dried milk products, dried brewer's yeast, distiller's dried solubles, fermentation solubles, or the like; dehydrated alfalfa meal; and various special additives such as additional riboflavin, vitamin $B_{12}$, calcium pantothenate, niacin, choline, vitamin K and vitamin E, or the like, as well as stabilized vitamin A, vitamin $D_3$ (D-activated animal sterols); calcium and phosphorous supplements such as dicalcium phosphate, steamed bone meal, defluoroinated phosphate, limestone, or the like; iodized salt, manganese sulfate, zinc carbonate, an antiobiotic feed supplement; methionine or its hydroxyanalog, and an antioxidant.

Thus, a typical starter feed for broilers would contain an active ingredient of Formula I in an amount of from about .005 to about .25 percent by weight and about 900 or more pounds per ton of a high energy grain product, 0 to 300 pounds per ton of medium and low energy grain product, 0 to 100 pounds per ton of stabilized fats, 500 to 650 pounds per ton of vegetable proteins, 20 to 100 pounds per ton of animal proteins, 50 to 100 pounds per ton of UGF sources and other B-vitamin carriers, 20 to 50 pounds per ton of dehydrated alfalfa meal, 0 to 65 pounds per ton of calcium and phosphorous supplements, 5 pounds per ton of iodized salt, 0.5 pound per ton of manganese sulfate (70 percent feeding grade), 25 pounds per ton of zinc carbonate, as well as amounts of the special additive listed above as are determined to be necessary for the specific flock being fed.

A typical finisher feed for broilers would contain an active ingredient of Formula I in an amount from about .005 to about .25 percent by weight and about 1000 or more pounds per ton of a high energy grain product, 0 to 300 pounds per ton of a medium and low energy grain product, 0 to 100 pounds per ton of stabilized fats, 300 to 450 pounds per ton of vegetable proteins, 0 to 100 pounds per ton of animal proteins, 50 to 100 pounds per ton of UGF sources and other B-vitamin carriers, 20 to 50 pounds per ton of dehydrated alfalfa meal, 0 to 50 pounds per ton of calcium and phosphorous supplements, 5 pounds per ton of iodized salt, 0.5 pound per ton of manganese sulfate (70 percent feeding grade), 25 pounds per ton of zinc carbonate, as well as amounts of the special additives listed above as are determined to be necessary for the specific flock being fed.

A typical general starter feed for broilers would contain an active ingredient of Formula I in an amount from about .005 to about .25 percent by weight and about 800 pounds or more per ton of a high energy grain product, 0 to 400 pounds per ton of medium and low energy grain product, 0 to 150 pounds per ton of stabilized fats, 350 to 600 pounds per ton of vegetable proteins, 20 to 150 pounds per ton of animal proteins, 20 to 50 pounds per ton of UGF sources and other B-vitamin carriers, 50 to 100 pounds per ton of dehydrated alfalfa meal, 20 to 60 pounds per ton of calcium and phosphorous supplements, 5 pounds per ton of iodized salt, 0.5 pound per ton of manganese sulfate (70 percent feeding grade), 25 pounds per ton of zinc carbonate, as well as amounts of the special additives listed above as are determined to be necessary for the specific flock being fed.

A typical grower feed for confined chicks would contain an active ingredient of Formula I in an amount from about .005 to about .25 percent by weight and about 700 pounds or more per ton of a high energy grain product, 0 to 600 pounds per ton of medium and low energy grain product, 0 to 150 pounds per ton of stabilized fats, 250 to 400 pounds per ton of vegetable proteins, 20 to 150 pounds per ton of animal proteins, 0 to 50 pounds per ton of UGF sources and other B-vitamin carriers, 50 to 100 pounds per ton of dehydrated alfalfa meal, 20 to 40 pounds per ton of calcium and phosphorous supplements, 5 pounds per ton of iodized salt, 0.5 pound per ton of manganese sulfate (70 percent feeding grade), 0.25 pound per ton of zinc carbonate, as well as amounts of the special additives listed above as are determined to be necessary for the specific flock being fed.

Accordingly, one embodiment of this invention is a feed active supplement composition containing compounds of Formula I in an amount sufficient to provide from about .005 to about .25 percent by weight of said compound in the composition intended for ingestion or in the total daily diet. Another embodiment of this invention is a feed additive concentrate or a feed additive premix containing a compound of Formula I in an amount sufficient to provide from about .005 to about .25 percent by weight of said compound in the composition intended for ingestion.

In conventional feed formulation, a feed additive supplement, premix or concentration intended for dilution to a complete feed containing the percentage of active ingredients outlined above contains from about 1 percent to about 50 percent by weight of the active ingredient. Such percentages in compositions intended for further dilution prior to ingestion are, of course, not critical.

Another embodiment of the invention comprises poultry drinking water which, as stated above, preferably contains the active ingredient (or its alkaline salts preferably alkali salts) in a range from about .0025 to about .05 percent by weight. Such a composition can be simply prepared by dispersing the compound of Formula I in the drinking water and mixing to insure a substantially uniform dispersion or a liquid premix or concentrate of the active ingredient can be prepared as an intermediate stage. The liquid preparations can advantageously be effected by utilization of chemical agents such as surface active agents (preferably anionic or non-ionic), chelating agents, emulsifiers, solubilizers, buffers, etc.

Besides active ingredients of Formula I, other active ingredients can be incorporated in the drinking water, complete feeds, feed additive supplements, feed additive concentrates or feed additive premixes. Such additional active ingredients are, for example, known feed additives, arsanilic acid, penicillin (preferably as procaine penicillin) and bacitracin.

Another embodiment of the present invention relates to the practice of animal husbandry and comprehends the method of combatting coccidiosis which comprises administering to poultry (especially chickens) compositions containing a sufficient amount of a compound of Formula I, so that the total amount of said compound ingested constitutes from about .005 to .25 percent by weight of the total daily feed consumption of the poultry. More specifically, an embodiment of the invention comprehends a method of controlling coccidiosis which comprises administering to poultry a feedstuff containing therein from about .005 to about .25 percent by weight of a compound of Formula I. In another embodiment the invention comprehends the method of controlling coccidiosis which comprises administering to poultry, drinking water containing from about .025 to about .125 percent by weight of a compound from Formula I.

The following examples are illustrative but not limitative of the invention. All temperatures are in degrees centigrade.

*Example 1*

To a solution of 4.5 g. of hydroxylamine hydrochloride and 6 g. of sodium carbonate in 30 ml. of water, there was added in portions, with ice-cooling and stirring 7 g. of 2-chloro-4-nitrobenzoylchloride. The mixture was stirred at room temperature for 20 hours. The product, 2-chloro-4-nitrobenzohydroxamic acid was filtered off, washed with water and dried in vacuo. After recrystallization from ethyl acetate-petroleum ether, 2-chloro-4-nitrobenzohydroxamic acid melted at 170–172°.

*Example 2*

To a cooled and stirred solution of 130 g. of hydroxylamine hydrochloride and 95 g. of sodium carbonate in 375 ml. of water, there was added in portions, 38 g. of 2-chloro-4-nitrobenzoylchloride, and the mixture stirred for 16 hours at room temperature. The solid was filtered off, washed with water and dried in vacuo. After recrystallization from ethyl acetate-petroleum ether, 2-chloro-4-nitrobenzohydroxamic acid melted at 170–172°.

*Example 3*

To a suspension of 2 g. of 2-chloro-4-nitrobenzohydroxamic acid in 15 ml. of water was added a solution of 0.37 g. of sodium hydroxide in 3.7 ml. of water. A clear yellow solution was obtained, which was added to 500 ml. of acetone. After standing for about 2 hours at room temperature, the yellow needles were filtered off and dried in vacuo. The sodium salt of 2-chloro-4-nitrobenzohydroxamic acid was purified by dissolving it in a minimum of water and adding the solution to excess acetone. It crystallized as the monohydrate and decomposed slowly from about 85° to 100°.

*Example 4*

To a solution of 35 g. of hydroxylamine hydrochloride and 26 g. of sodium carbonate in 100 ml. of water, there was added in portions with ice-cooling 10 g. of 2,4-dinitrobenzoylchloride, and the mixture was stirred at room temperature for 16 hours. The condensation product, 2,4-dinitrobenzohydroxamic acid was filtered off and slurried with cold 1 N hydrochloric acid. The compound was isolated by filtration, washed with water and dried in vacuo. After recrystallization from ethanol-petroleum ether, 2,4-dinitrobenzohydroxamic acid melted at 191–192° (dec.).

*Example 5*

To a solution of 11 g. of methoxyamine hydrochloride in 60 ml. of pyridine, there was added with cooling 5.5 g. of 2-chloro-4-nitrobenzoylchloride. The mixture was kept at room temperature for 20 hours, and then added to 250 ml. of 3 N hydrochloric acid. The product, O-methyl-2-chloro-4-nitrobenzohydroxamic acid, was filtered off, washed with water, and dried in vacuo. After recrystallization from dilute ethanol, O-methyl-2-chloro-4-nitrobenzohydroxamic acid melted at 160–162°.

*Example 6*

A medicated poultry feed intended as a starter feed for broilers is prepared by blending 0.0125 percent by weight of 2-chloro-4-nitrobenzohydroxamic acid in a basic poultry ration consisting of:

Ingredients:

| Ingredient | Unit | Amount |
|---|---|---|
| Corn meal, No. 2, yellow, ground | Lbs./ton | 1123 |
| Stabilized grease or vegetable oil | do | 60 |
| Soybean oil meal, low fiber 50 | do | 480 |
| Corn gluten meal | do | 50 |
| Fish meal, antioxidant-treated, 60% protein | Lbs./ton | 30 |
| Fish solubles, dried basis | do | 10 |
| Meat and bone scraps, 50% protein | do | 140 |
| Corn distillers dried solubles | do | 50 |
| Alfalfa meal, 17% protein, 100,000 a./lb. | Lbs./ton | 30 |
| Salt, iodized | do | 5 |
| Manganese sulfate, feed grade | do | 0.75 |
| Zinc carbonate or oxide | Lbs./ton | 0.25 |
| Riboflavin | grams | 3 |
| Vitamin $B_{12}$ | milligrams | 6 |
| Calcium pantothenate | grams | 5 |
| Niacin | do | 30 |
| Stabilized vitamin A | USP units | 6,000,000 |
| Vitamin $D_3$ | IC units | 650,000 |
| Vitamin E acetate | IU | 5,000 |
| Vitamin K (menadione sodium bisulfite) | grams | 2 |
| DL-methionine or hydroxy analog | lb | 1 |
| Antioxidant (ethoxyquin or butylated hydroxy toluene) | lb | 0.25 |

Similar feeds can be prepared containing 2-chloro-4-nitrobenzohydroxamic acid at other concentrations, for example, containing 0.025 percent, 0.05 percent or 0.1 percent by weight of said compound.

*Example 7*

A medicated poultry feed intended as a finisher feed for broilers is prepared by blending 0.0125 percent by weight of 2-chloro-4-nitrobenzohydroxamic acid in a basic poultry ration consisting of:

Ingredients:

| Ingredient | Unit | Amount |
|---|---|---|
| Corn meal, No. 2, yellow, ground | Lbs./ton | 1234 |
| Stabilized grease or vegetable oil | do | 80 |
| Soybean oil meal, low fiber, 50% protein | Lbs./ton | 350 |
| Corn gluten meal | do | 100 |
| Fish meal, antioxidant-treated 60% protein | Lbs./ton | 30 |
| Meat and bone scraps, 50% protein | do | 100 |
| Corn distillers dried solubles | do | 50 |
| Alfalfa meal, 17% protein, 100,000 a./lb. | Lbs./ton | 30 |
| Dicalcium phosphate | do | 10 |
| Salt, iodized | do | 5 |
| Manganese sulfate, feed grade | do | 0.35 |
| Zinc carbonate or oxide | do | 0.15 |
| Riboflavin | grams | 3 |
| Vitamin $B_{12}$ | milligrams | 6 |
| Calcium pantothenate | grams | 5 |
| Niacin | do | 50 |
| Stabilized vitamin A | USP units | 3,000,000 |
| Vitamin $D_3$ | IC units | 650,000 |
| Vitamin E acetate | IU | 5,000 |
| Vitamin K (menadione sodium bisulfite) | grams | 2 |
| Antioxidant (ethoxyquin or butylated hydroxy toluene) | lb | 0.25 |

Similar feeds can be prepared containing 2-chloro-4-nitrobenzohydroxamic acid at other concentrations, for example, containing 0.025 percent, 0.05 percent or 0.1 percent by weight of said compound.

*Example 8*

A medicated poultry feed is prepared by blending 0.0125 percent by weight of 2-chloro-4-nitrobenzohydroxamic acid with a broiler chow manufactured by the Ralston Purina Co. Ltd., St. Louis Mo. A similar feed can be prepared containing 2-chloro-4-nitrobenzohydroxamic acid in other proportions, for example, amounts of 0.025, 0.05 and 0.1 percent by weight.

*Example 9*

A medicated poultry feed intended as starter feed for replacement chicks is prepared by blending 0.0125 percent by weight of 2-chloro-4-nitrobenzohydroxamic acid in a basic poultry ration consisting of:

Ingredients:

| | |
|---|---:|
| Corn meal, No. 2, yellow, ground Lbs./ton | 935 |
| Oats or barley, ground do | 300 |
| Stabilized grease or vegetable oil do | 30 |
| Soybean oil meal, low fiber, 50% do | 495 |
| Fish meal, antioxidant-treated, 60% protein Lbs./ton | 50 |
| Meat and bone scraps, 50% protein Lbs./ton | 50 |
| Corn distillers dried solubles do | 50 |
| Alfalfa meal, 17% protein, 100,000 a./lb. Lbs./ton | 50 |
| Dicalcium phosphate do | 15 |
| Limestone, ground do | 20 |
| Salt, iodized do | 5 |
| Manganese sulfate, feed grade do | 0.4 |
| Zinc carbonate or oxide do | 0.15 |
| Riboflavin grams | 3 |
| Vitamin $B_{12}$ milligrams | 4 |
| Calcium pantothenate grams | 4 |
| Niacin do | 10 |
| Stabilized vitamin A USP units | 4,000,000 |
| Vitamin $D_3$ IC units | 500,000 |
| Vitamin E acetate IU | 5,000 |
| Vitamin K (menadione sodium bisulfite) grams | 1 |
| DL-Methionine or hydroxy analog lb | 0.5 |
| Antioxidant (ethoxyquin or butylated hydroxy toluene) lb | 0.25 |

Similar feeds can be prepared containing 2-chloro-4-nitrobenzohydroxamic acid at other concentrations, for example, containing 0.025 percent, 0.05 percent or 0.1 percent by weight of said compound.

*Example 10*

A medicated poultry feed intended as a grower feed for confined chicks is prepared by blending 0.0125 percent by weight of 2-chloro-4-nitrobenzohydroxamic acid in a basic poultry ration consisting of:

Ingredients:

| | |
|---|---:|
| Corn meal, No. 2, yellow, ground Lbs./ton | 1300 |
| Wheat flour middlings do | 200 |
| Soybean oil meal, low fiber, 50% protein Lbs./ton | 275 |
| Fish meal, antioxidant-treated, 60% protein Lbs./ton | 30 |
| Meat and bone scraps, 50% protein Lbs./ton | 100 |
| Corn distillers dried solubles do | 25 |
| Alfalfa meal, 17% protein, 100,000 a./lb. Lbs./ton | 50 |
| Limestone, ground do | 10 |
| Salt, iodized do | 5 |
| Manganese sulfate, feed grade do | 0.4 |
| Zinc carbonate or oxide do | 0.15 |
| Riboflavin grams | 3 |
| Vitamin $B_{12}$ milligrams | 6 |
| Calcium pantothenate grams | 2 |
| Niacin do | 30 |
| Stabilized vitamin A USP units | 2,000,000 |
| Vitamin $D_3$ IC units | 500,000 |
| Vitamin K (menadione sodium bisulfite) grams | 1 |

Similar feeds can be prepared containing 2-chloro-4-nitrobenzohydroxamic acid at other concentrations, for example, containing 0.025 percent, 0.05 percent or 0.1 percent by weight of said compound.

*Example 11*

Poultry drinking water was prepared by adding the sodium salt of 2-chloro-4-nitrobenzohydroxamic acid to poultry drinking water in an amount to provide 0.1, 0.05, or 0.025 mg. of said compound per liter of drinking water.

*Example 12*

A medicated poultry feed intended as starter feed for replacement chicks is prepared by blending 0.0125 percent by weight of 2-chloro-4-nitrobenzohydroxamic acid in a basic poultry ration consisting of:

Ingredients:

| | |
|---|---:|
| Corn meal, No. 2, yellow, ground Lbs./ton | 935 |
| Oats or barley, ground do | 300 |
| Stabilized grease or vegetable oil do | 30 |
| Soybean oil meal, low fiber, 50 percent Lbs./ton | 495 |
| Fish meal, antioxidant-treated, 60 percent protein Lbs./ton | 50 |
| Meat and bone scraps, 50 percent protein Lbs./ton | 50 |
| Corn distillers dried solubles do | 50 |
| Alfalfa meal, 17 percent protein, 100,000 a./lb. Lbs./ton | 50 |
| Dicalcium phosphate do | 15 |
| Limestone, ground do | 20 |
| Salt, iodized do | 5 |
| Manganese sulfate, feed grade do | 0.4 |
| Zinc carbonate or oxide do | 0.15 |
| Riboflavin grams | 3 |
| Vitamin $B_{12}$ milligrams | 4 |
| Calcium pantothenate grams | 4 |
| Niacin do | 10 |
| Stabilized vitamin A USP units | 4,000,000 |
| Vitamin $D_3$ IC units | 500,000 |
| Vitamin E acetate IU | 5,000 |
| Vitamin K (menadione sodium bisulfite) grams | 1 |
| DL-methionine or hydroxy analog lb | 0.5 |
| Antioxidant (ethoxyquin or butylated hydroxy toluene) lb | 0.25 |
| Arsanilic acid grams | 90 |
| Penicillin (as procaine) do | 4 |
| Bacitracin do | 20 |

Similar feeds can be prepared containing 2-chloro-4-nitrobenzohydroxamic acid at other concentrations, for example, containing 0.025 percent, 0.05 percent or 0.1 percent by weight of said compound.

We claim:

1. The method of preventing coccidiosis in poultry which comprises orally administering to said poultry, a prophylactically effective amount of a compound selected from the group consisting of compounds of the formula

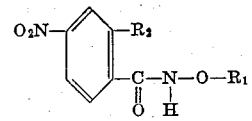

and alkali metal salts thereof,
   wherein $R_1$ is selected from the group consisting of hydrogen and methyl and $R_2$ is selected from the group consisting of halo and nitro,
   in a carrier selected from the group consisting of animal feed and drinking water.

2. The method according to claim 1 wherein the compound is 2-chloro-4-nitro-benzohydroxamic acid.

3. The method according to claim 1 wherein the compound is 2,4-dinitrobenzohydroxamic acid.

4. The method according to claim 1 wherein the compound is O - methyl - 2 - chloro-4-nitrobenzohydroxamic acid.

5. The method according to claim 2 wherein the carrier is animal feed.

6. The method according to claim 2 wherein the carrier is drinking water.

References Cited

Chem. Abs., vol. 52, 1958, p. 17510b.
Chem. Abs., vol. 51, 1957, p. 1891 i.

ALBERT T. MEYERS, *Primary Examiner.*
R. S. BARRESE, *Assistant Examiner.*

UNITED STATES PATENT OFFICE
CERTIFICATE OF CORRECTION

Patent No. 3,364,110   January 16, 1968

Hanns Hanina Lehr et al.

It is certified that error appears in the above identified patent and that said Letters Patent are hereby corrected as shown below:

Column 3, line 3, "drain" should read -- grain --. Column 4, line 12, "active" should read -- additive --; line 23, "concentration" should read -- concentrate --; line 63, ".025" should read -- .0025 --.

Signed and sealed this 12th day of August 1969.

(SEAL)
Attest:

Edward M. Fletcher, Jr.
Attesting Officer

WILLIAM E. SCHUYLER, JR.
Commissioner of Patents